(12) United States Patent
Liu et al.

(10) Patent No.: US 12,457,140 B2
(45) Date of Patent: Oct. 28, 2025

(54) SYMBOL RESERVATION, INQUIRY, AND NOTIFICATION METHODS, FIRST NODE, SECOND NODE, AND MEDIUM

(71) Applicant: ZTE CORPORATION, Guangdong (CN)

(72) Inventors: Wenhao Liu, Guangdong (CN); Youxiong Lu, Guangdong (CN); Ting Miao, Guangdong (CN); Weimin Xing, Guangdong (CN); Feng Bi, Guangdong (CN)

(73) Assignee: ZTE Corporation, Shenzhen (CN)

( * ) Notice: Subject to any disclaimer, the term of this patent is extended or adjusted under 35 U.S.C. 154(b) by 380 days.

(21) Appl. No.: 18/019,519

(22) PCT Filed: Aug. 3, 2021

(86) PCT No.: PCT/CN2021/110258
§ 371 (c)(1),
(2) Date: Feb. 3, 2023

(87) PCT Pub. No.: WO2022/028406
PCT Pub. Date: Feb. 10, 2022

(65) Prior Publication Data
US 2023/0327928 A1  Oct. 12, 2023

(30) Foreign Application Priority Data
Aug. 3, 2020 (CN) .......................... 202010769212.1

(51) Int. Cl.
*H04L 27/26* (2006.01)
*H04W 72/232* (2023.01)

(52) U.S. Cl.
CPC ....... *H04L 27/2605* (2013.01); *H04W 72/232* (2023.01)

(58) Field of Classification Search
CPC .............. H04L 5/0094; H04L 27/2605; H04L 274/2602; H04L 5/005; H04W 72/232; H04W 72/23; H04W 88/04
See application file for complete search history.

(56) References Cited

U.S. PATENT DOCUMENTS

2014/0348088 A1   11/2014 Yu
2016/0021577 A1   1/2016 Du
(Continued)

FOREIGN PATENT DOCUMENTS

CN  109831809 A  5/2019
CN  110536466 A  12/2019
(Continued)

OTHER PUBLICATIONS

International Search report for the International Patent Application No. PCT/CN2021/110258, mailed Nov. 3, 2021, 4 pages.
(Continued)

*Primary Examiner* — Andrew Lee
(74) *Attorney, Agent, or Firm* — KDW Firm PLLC

(57) ABSTRACT

Provided are a symbol reservation, inquiry, and notification methods, a first node, a second node and a medium. The method includes determining a first element set, and sending request information, where the request information is used for requesting to reserve or not reserve a guard symbol at a transition in a case where a second unit of the first node performs transmission or reception on elements in the first element set.

14 Claims, 5 Drawing Sheets

```
┌────────────────────────────────────┐
│  Determine a first element set     │ 210
└────────────────────────────────────┘
                 │
                 ▼
┌──────────────────────────────────────────────────────────────┐
│ Send indication information, where the indication            │
│ information is used for notifying a first node that the       │ 220
│ second node reserves or does not reserve a guard symbol at   │
│ a transition position in a case where a second unit of the   │
│ first node performs transmission or reception on elements    │
│ in the first element set                                     │
└──────────────────────────────────────────────────────────────┘
```

(56) References Cited

U.S. PATENT DOCUMENTS

| | | | | |
|---|---|---|---|---|
| 2019/0158245 | A1* | 5/2019 | Zeng | H04W 72/12 |
| 2019/0349878 | A1* | 11/2019 | Ashraf | H04L 5/0007 |
| 2021/0210072 | A1* | 7/2021 | Parc | G10L 15/07 |
| 2021/0227544 | A1* | 7/2021 | Luo | H04B 7/022 |
| 2021/0235345 | A1* | 7/2021 | Luo | H04W 36/0011 |
| 2021/0273836 | A1* | 9/2021 | Luo | H04L 5/0073 |
| 2022/0141074 | A1* | 5/2022 | You | H04L 27/2666 375/262 |
| 2023/0126621 | A1* | 4/2023 | You | H04L 5/003 |

FOREIGN PATENT DOCUMENTS

| | | |
|---|---|---|
| CN | 110831187 A | 2/2020 |
| CN | 111918341 A | 11/2020 |
| WO | 2018126777 A1 | 7/2018 |
| WO | 2019212297 A1 | 11/2019 |

OTHER PUBLICATIONS

Qualcomm Incorporated "Enhancements to support NR backhaul links" 3GPP TSG RAN WG1 Meeting #93 R1-1807393—Busan, Korea, May 21-May 25, 2018.

AT&T, "Summary #3 of 7.2.3.3—Mechanisms for resource multiplexing among backhaul and access links," R1-20xxxxx, 3GPP TSG-RAN WG1 Meeting #100-e e-Meeting, Agenda Item: 7.2.3.3: 37 pages (2020).

Vivo, "On Guard Symbol MAC CE Design," R2-2004494, 3GPP TSG-RAN WG2 Meeting #110 electronic Online, Agenda Item: 6.1.4: 7 pages (Jun. 2020).

Chinese Search Report for CN Application No. 202010769212.1, dated Nov. 14, 2024, 7 pages.

Chinese Notice of Opinion for the First Review for CN Application No. 202010769212.1, dated Nov. 19, 2024, 24 pages.

* cited by examiner

| R | R | R | R | R | R | SCS |
|---|---|---|---|---|---|---|
| NmbGS1 || NmbGS2 ||| NmbGS3 ||
| NmbGS3 | NmbGS4 ||| NmbGS5 || NmbGS6 |
| NmbGS6 || NmbGS7 || NmbGS8 |||

| sigCh Notify | R | R | R | R | R | SCS |
|---|---|---|---|---|---|---|
| NmbGS1 ||| NmbGS2 ||| NmbGS3 |
| NmbGS3 | NmbGS4 ||| NmbGS5 || NmbGS6 |
| NmbGS6 || NmbGS7 || NmbGS8 |||

SYMBOL RESERVATION, INQUIRY, AND NOTIFICATION METHODS, FIRST NODE, SECOND NODE, AND MEDIUM

CROSS-REFERENCE TO RELATED APPLICATIONS

This is a National Stage Application filed under 35 U.S.C. 371 based on International Patent Application No. PCT/CN2021/110258, filed on Aug. 3, 2021, which claims priority to Chinese Patent Application No. 202010769212.1 filed on Aug. 3, 2020, the disclosures of both of which are incorporated herein by reference in their entireties.

TECHNICAL FIELD

The present application relates to wireless communication networks, for example, a symbol reservation, inquiry, and notification methods, a first node, a second node and a medium.

BACKGROUND

In an Integrated Access and Backhaul (JAB) network, for one IAB node, the upper-level node is called the parent node, and the next level node is called the child node. The IAB node includes a first unit for transmitting data between the parent node and the first unit, and a second unit for transmitting data between the child node and the second unit. The timing of the first unit is controlled by the scheduling of the parent node, the second unit determines the timing of downlink transmission according to the time information and a time system such as Global Positioning System (GPS) or BeiDou Navigation Satellite System provided by the parent node, and the timing of uplink reception can be determined according to the uplink scheduling of the child node or a terminal. The timing between the first unit and the second unit has a certain deviation, and the guard interval of the transition between the data transmission of the first unit and the data transmission of the second unit can be achieved by introducing the guard symbol. However, under what cases the second node will reserve guard symbols is uncertain. Because of the lack that an effective mechanism to reserve the guard symbols can accurate the reservation case of the guard symbols, the IAB nodes cannot accurately switch operations for data transmission.

SUMMARY

The present application provides a symbol reservation, inquiry and notification methods, a first node, a second node and a medium so as to implement to reserve or not reserve a guard symbol for the transmitting a first element set, and to improve the certainty and reliability of symbol reservation.

Embodiments of the present application provide a symbol reservation method. The symbol reservation method is applied to a first node and includes the following.

A first element set is determined.

Request information is sent, where the request information is used for requesting to reserve or not reserve a guard symbol at a transition in a case where a second unit of the first node performs transmission or reception on elements in the first element set.

Embodiments of the present application further provide a symbol reservation method. The symbol reservation method is applied to a second node and includes the following.

A first element set is determined.

Indication information is sent, where the indication information is used for notifying a first node that the second node reserves or does not reserve a guard symbol at a transition in a case where a second unit of the first node performs transmission or reception on elements in the first element set.

Embodiments of the present application further provide an inquiry method. The inquiry method is applied to a first node and includes the following.

A first element set is determined.

Inquiry information is sent, where the inquiry information is used for inquiring known information about a second node to the first element set, and the first element set is used for the second node to reserve or not reserve a guard symbol at a transition in a case where a second unit of a first node performs transmission or reception on elements in the first element set.

Embodiments of the present application further provide a notification method. The notification method is applied to a second node and includes the following.

A first element set is determined.

Notification information is sent, where the notification information is used for notifying a first node of known information about the second node to the first element set, and the first element set is used for the second node to reserve or not reserve a guard symbol at a transition in a case where a second unit of the first node performs transmission or reception on elements in the first element set.

Embodiments of the present application further provide a first node. The first node includes at least one processor; and a storage apparatus configured to store one or more programs.

When executed by the one or more processors, the one or more programs cause the one or more processors to implement the symbol reservation method and the inquiry method applied to the first node.

Embodiments of the present application further provide a second node. The second node includes at least one processor; and a storage apparatus configured to store one or more programs.

When executed by the one or more processors, the one or more programs cause the one or more processors to implement the symbol reservation method and the notification method applied to the second node.

Embodiments of the present application further provide a computer-readable storage medium for storing a computer program which, when executed by a processor, causes the processor to perform the preceding symbol reservation method, inquiry method or notification method.

DETAILED DESCRIPTION

Figure 1:
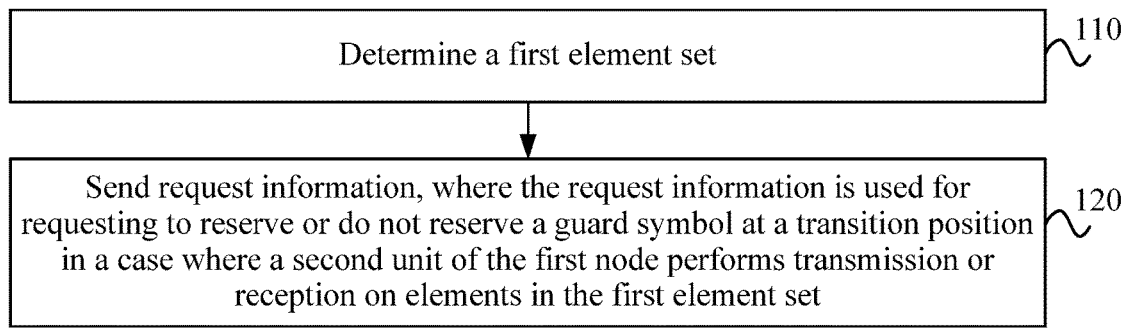
FIG. 1 is a flowchart of a symbol reservation method according to an embodiment.

The present application is described hereinafter in conjunction with drawings and embodiments. It is to be understood that the embodiments described herein are intended to explain the present application and not to limit the present application. It is to be noted that if not in collision, embodiments of the present application and features therein may be combined with each other in any manner. Additionally, it is to be noted that for ease of description, only part, not all, of structures related to the present application are illustrated in the drawings.

The present application provides a symbol reservation method. The first node requests the second node to reserve or not reserve the guard symbol for the transmission of the elements in the first element set at the transition, so as to make clear the reservation condition of the guard symbol and improve the certainty and reliability of reserving the guard symbol. On this basis, the first node can accurately perform data transmission operation.

FIG. 1 is a flowchart of a symbol reservation method according to an embodiment. The method may be applied to a first node. As shown in FIG. 1, the method provided in this embodiment includes 110 to 120.

In 110, a first element set is determined.

In 120, request information is sent, where the request information is used for requesting to reserve or not reserve a guard symbol at a transition in a case where a second unit of the first node performs transmission or reception on elements in the first element set.

In this embodiment, the first node includes a first unit and the second unit, where transmission or reception operation of the first unit is controlled by the second node, the second unit is used for scheduling a next level child node, and the child node may be a child node of the same type as the first node or a terminal device. The first node may be an IAB node, and the second node is a parent node of the IAB node. The first unit is a unit communicating with the second node, such as a mobile terminal (MT) unit of the IAB node, and the second unit is a unit communicating with the next level child node, such as a distributed unit (DU) of the IAB node.

In this embodiment, the reserved guard symbol means that the second node does not schedule one or more orthogonal frequency division multiplexing (OFDM) symbols corresponding to the first unit of the first node. The meaning of the transition is, for example, that, for two adjacent time units, in the first time unit, the first unit of the first node performs a transmission or reception operation, and in the second time unit, the second unit of the first node performs a transmission or reception operation on elements in the first element set; alternatively, in the first time unit, the second unit of the first node performs a transmission or reception operation on elements in the first element set, and in the second time unit, the first unit of the first node performs a transmission or reception operation.

The meaning of the transition is, for example, that, for two adjacent time units, in the first time unit, the second unit of the first node performs a transmission or reception operation on the first attribute resource, and in the second time unit, the second unit of the first node performs a transmission or reception operation on the second attribute resource; alternatively, in the first time unit, the second unit of the first node performs a transmission or reception operation on the second attribute resource, and in the second time unit, the second unit of the first node performs a transmission or reception operation on the first attribute resource.

The meaning of the transition is, for example, that, for two adjacent time units, in the first time unit, the first attribute resource corresponds to the second unit of the first node, and in the second time unit, the second attribute resource corresponds to the second unit of the first node; alternatively, in the first time unit, the second attribute resource corresponds to the second unit of the first node, and in the second time unit, the first attribute resource corresponds to the second unit of the first node.

In this embodiment, the first node requests the second node, which means that the first node requests the second node to reserve a guard symbol or requests the second node to do not reserve a guard symbol at the transition in a case where the second unit of the first node sends or receives elements in the first element set.

In this embodiment, the first element set is used for representing to request the second node to perform the guard symbol reservation mechanism in the case where the first node transmits which signal and/or which channel. For example, if the first element set includes a physical downlink control channel (PDCCH) of a type 0 search space, the request information may be used for requesting the second node to reserve the guard symbol at the transition in a case where the second unit of the first node transmits the PDCCH of the type 0 search space, and if the PDCCH transmitted by the second unit of the first node is not the PDCCH of the type 0 search space, the second node is not requested to reserve the guard symbol. For another example, if the first element set includes a synchronization signal block and a physical broadcast channel (SSB), the request information may be used for requesting the second node to do not reserve the guard symbol at the transition in a case where the second unit of the first node transmits the SSB. For another example, if the first element set includes an uplink scheduling request (SR), the request information may be used for requesting the second node to reserve the guard symbol at the transition in a case where the second unit of the first node transmits the SR, and for requesting the second node to do not reserve the guard symbol if the second unit of the first node does not transmit the SR. For another example, if the first element set includes a periodic channel-state information reference signal (CSI-RS), the request information may be used for requesting the second node to reserve the guard symbol at the transition in a case where the second unit of the first node transmits the periodic CSI-RS, and for requesting the second node to do not reserve the guard symbol if the second unit of the first node does not transmit the periodic CSI-RS. Therefore, it is clear under what cases the guard symbol needs to be reserved.

In this embodiment, the first element set may be an empty set. The first node requests the second node to reserve the guard symbol at the transition in a case where the second unit of the first node transmits the empty set, that is, the first node requests the second node to do not reserve the guard symbol at the transition in a case where the second unit of the first node transmits any signal or channel. Similarly, the first node requests the second node to do not reserve the guard symbol at the transition in a case where the second unit of the first node transmits the empty set, that is, the first node requests the second node to reserve the guard symbol at the transition in a case where the second unit of the first node transmits any signal or channel.

In an embodiment, the first element set may be determined by predefinition (e.g., protocol predefinition or first node-second node agreement), a signaling indication, or an interaction combination of predefinition and signaling, where the signaling includes at least one of high layer signaling, physical layer signaling, or media access control control element (MAC CE) signaling.

In this embodiment, the first node requests the second node to reserve or not reserve the guard symbol at the transition and for transmitting the elements in the first element set, so as to make clear the reservation condition of the guard symbol and improve the certainty and reliability of symbol reservation. On this basis, the first node can achieve the accurate the transition operation between the first unit and the second unit.

In an embodiment, the transition includes a transition between an operation of a first unit of the first node and an operation of the second unit of the first node; or a transition between an operation of the second unit on a first attribute resource and an operation of the second unit on a second attribute resource; or a transition between a first attribute resource corresponding to the second unit and a second attribute resource corresponding to the second unit.

In this embodiment, the transition may refer to the transition between the operation of the first unit and the operation of the second unit, the transition between the operations of the second unit on different attribute resources, or the transition of the second unit on different attribute resources.

In an embodiment, the first attribute resource includes at least one of the following: a not available (NA) resource, a not indicated available (NIA) soft resource, a time unit where an NA resource is located, or a time unit where an NIA soft resource is located; and the second attribute resource includes at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

Figure 2:
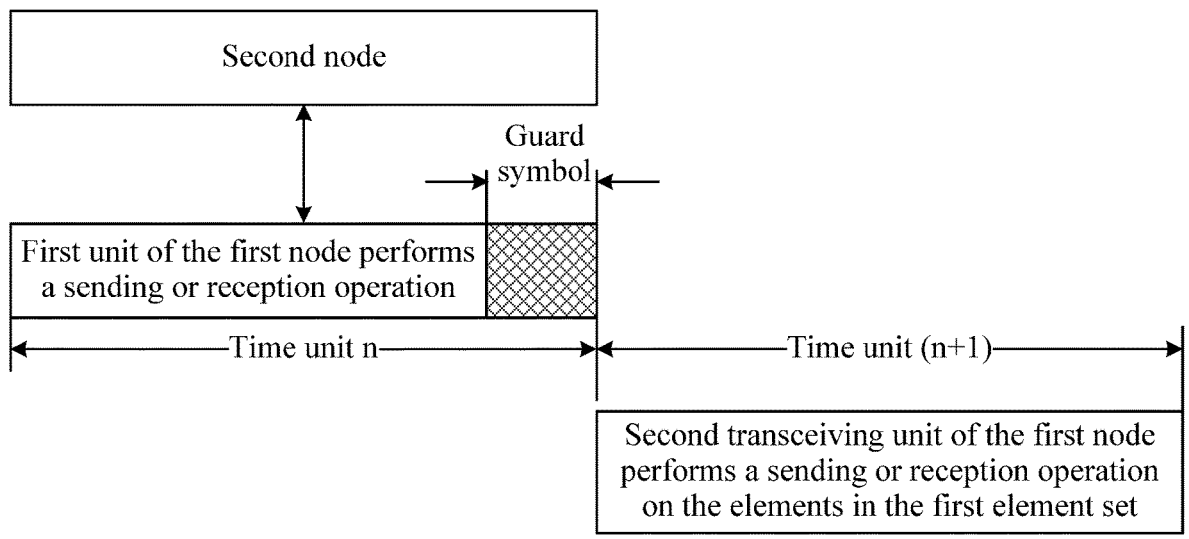
FIG. 2 is a schematic diagram of switching from an operation of a first unit of a first node to an operation of a second unit of a first node according to an embodiment.

FIG. 2 is a schematic diagram of switching from an operation of a first unit of a first node to an operation of a second unit of a first node according to an embodiment. As shown in FIG. 2, the second node schedules the first node to perform a transmission or reception operation at a time unit n, and the second unit of the first node performs a transmission or reception operation of the elements in the first element set at a time unit (n+1). The first node may request the second node, in particular, to reserve the guard symbol at the transition before switching to the operation of the second unit on the elements in the first element set, or the second node does not schedule several OFDM symbols (as shown in the grid section in FIG. 2) of the first unit corresponding to the first node at a transition of the operation of the second unit on the elements in the first element set.

Figure 3:
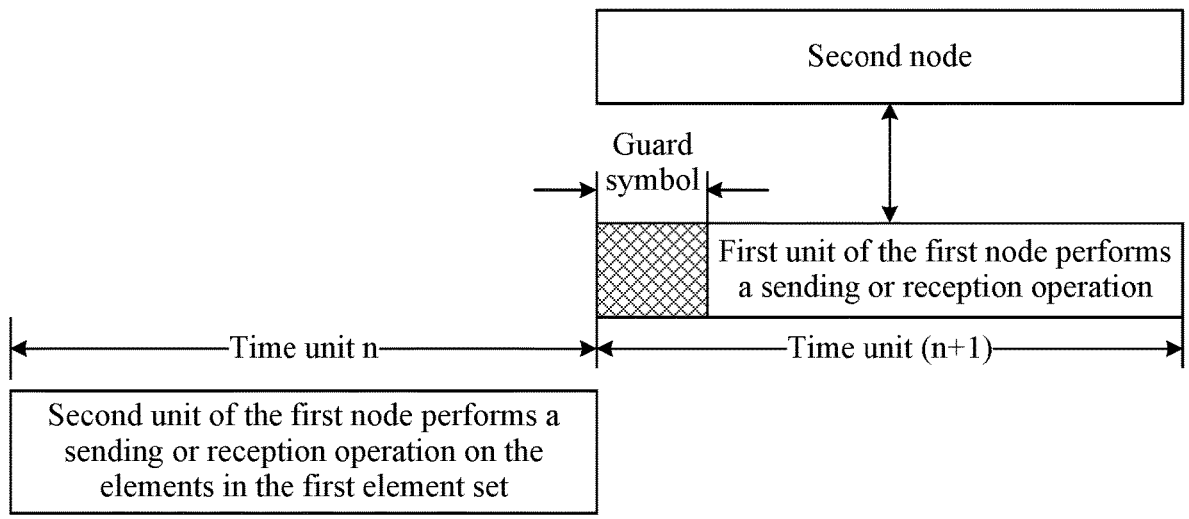
FIG. 3 is a schematic diagram of switching from an operation of a second unit of a first node to an operation of a first unit of a first node according to an embodiment.

FIG. 3 is a schematic diagram of switching from an operation of a second unit of a first node to an operation of a first unit of a first node according to an embodiment. As shown in FIG. 3, the second unit of the first node performs a transmission or reception operation in the elements of the first element set at a time unit n, and the second node schedules the first unit of the first node to perform a transmission or reception operation at a time unit (n+1). The first node may request the second node, in particular, to reserve the guard symbol at the transition at the transition of an operation end position of the second unit on the elements of the first element set, or the second node does not schedule several OFDM symbols (as shown in the grid section in FIG. 3) of time unit (n+1) of the first unit corresponding to the first node at a transition of the operation of the second unit on the elements in the first element set.

TABLE 1 a transition type between an operation of a first unit of the first node and an operation of the second unit of the first node
Transition type

|   | | |
|---|---|---|
| 1 | The first unit of the first node to the second unit of the first node | The first unit of the first node receives The second unit of the first node sends |
| 2 | | The first unit of the first node receives The second unit of the first node receives |
| 3 | | The first unit of the first node sends The second unit of the first node sends |
| 4 | | The first unit of the first node sends The second unit of the first node receives |
| 5 | The second unit of the first node to the first unit of the first node | The second unit of the first node receives The first unit of the first node sends |
| 6 | | The second unit of the first node receives The first unit of the first node receives |
| 7 | | The second unit of the first node sends The first unit of the first node sends |
| 8 | | The second unit of the first node sends The first unit of the first node receives |

Table 1 is a transition type between an operation of a first unit of the first node and an operation of the second unit of the first node. As shown in table 1, there are eight cases of the transition types of different transmission or reception operations. FIGS. 2 and 3 correspond to different transition types, respectively. As shown in FIG. 2, if the first time unit corresponds to the sending operation of the first unit of the first node and the second time unit corresponds to the sending operation of the second unit of the first node, the directional combination shown in FIG. 2 corresponds to the transition type having the serial number of 3 in Table 1. As shown in FIG. 3, if the first time unit corresponds to the sending operation of the second unit of the first node and the second time unit corresponds to the sending operation of the first unit of the first node, the direction shown in FIG. 3 corresponds to the transition type having the serial number of 7 in Table 1.

In an embodiment, the first element set is an empty set, or the first element set includes one of the following: a first set, a second set, which is a subset of the first set, a third set, which is one set of a set group, a set composed of elements in the first set other than elements in the second set, or a set composed of elements in the set group other than elements in the third set.

It is to be noted that in this embodiment, the first element set, the first set, the second set, the third set and each set in the set group are sets composed of signals and/or channels transmitted by the second unit of the first node, if each set is a non-empty set, the elements thereof include signals and/or channels, and transmitting the elements in the first element set includes sending the elements in the first element set or receiving the elements in the first element set.

For example, the first element set is the empty set. In this case, the first node requests the second node to reserve the guard symbol at the transition in a case where the second unit of the first node transmits the empty set, that is, the first node requests the second node to do not reserve the guard symbol at the transition regardless of any signal or channel transmitted by the second unit of the first node; or the first node requests the second node to do not reserve the guard symbol at the transition in a case where the second unit of the first node transmits the empty set, that is, the first node requests the second node to reserve the guard symbol at the transition regardless of any signal or channel transmitted by the second unit of the first node.

For example, the first element set is the first set. In this case, the first node requests the second node to reserve the guard symbol at the transition in a case where the second unit of the first node transmits the elements of the first element set, that is, the first node requests the second node to reserve the guard symbol at the transition in a case where the second unit of the first node transmits signals and/or channels of the first set; or the first node requests the second node to do not reserve the guard symbol at the transition in a case where the second unit of the first node transmits the elements of the first element set, that is, the first node requests the second node to do not reserve the guard symbol at the transition in a case where the second unit of the first node transmits signals and/or channels of the first set.

In an embodiment, the first set is an empty set (this is consistent with the case where the first element set is an empty set), or the first set includes at least one of the following: a periodic channel state information reference signal (CSI-RS), a SSB, a random access channel (RACH), a scheduling request (SR) or a PDCCH corresponding to a type 0 search space.

In an embodiment, the PDCCH corresponding to the type 0 search space may be a PDCCH corresponding to a type 0 search space defined by a master indication block (MIB).

For example, the first element set is the second set, and the second set is a subset of the first set. This case may be understood to mean that in one first set, signals and/or channels are further selected to form a second set as a basis for requesting that the second node reserves or does not reserve symbols. In this case, the first node requests the second node to reserve the guard symbol at the transition in a case where the second unit of the first node transmits the elements of the first element set, that is, the first node requests the second node to reserve the guard symbol at the transition in a case where the second unit of the first node transmits signals and/or channels of the second set; or the first node requests the second node to do not reserve the guard symbol at the transition in a case where the second unit of the first node transmits the elements of the first element set, that is, the first node requests the second node to do not reserve the guard symbol at the transition in a case where the second unit of the first node transmits signals and/or channels of the second set.

For example, the first element set is a third set, and the third set is one set of the set group. This case may be understood to mean that in one set group, one set is further selected to form the third set as a basis for requesting that the second node reserves or does not reserve symbols. In this case, the first node requests the second node to reserve the guard symbol at the transition in a case where the second unit of the first node transmits the elements of the first element set, that is, the first node requests the second node to reserve the guard symbol at the transition in a case where the second unit of the first node transmits signals and/or channels of the third set; or the first node requests the second node to do not reserve the guard symbol at the transition in a case where the second unit of the first node transmits the elements of the first element set, that is, the first node requests the second node to do not reserve the guard symbol at the transition in a case where the second unit of the first node transmits signals and/or channels of the third set.

For example, the first element set is a set composed of elements remaining in the first set except the elements in the second set. This case may be understood to mean that the set composed of elements remaining after the elements belonging to the second set are removed from the first set is served as a basis for requesting that the second node reserves or does not reserve symbols. In this case, the first node requests the second node to reserve the guard symbol at the transition in a case where the second unit of the first node transmits the elements of the first element set, that is, the first node requests the second node to reserve the guard symbol at the transition in a case where the second unit of the first node transmits signals or channels in the first set other than elements in the second set; or the first node requests the second node to do not reserve the guard symbol at the transition in a case where the second unit of the first node transmits the elements of the first element set, that is, the first node requests the second node to do not reserve the guard symbol at the transition in a case where the second unit of the first node transmits signals or channels in the first set other than elements in the second set.

For example, the first element set is a set composed of elements remaining in the set group except the elements in the third set. This case may be understood to mean that the set composed of elements remaining after the elements belonging to the third set are removed from the set group is served as a basis for requesting that the second node reserves or does not reserve symbols. In this case, the first node requests the second node to reserve the guard symbol at the transition in a case where the second unit of the first node transmits the elements of the first element set, that is, the first node requests the second node to reserve the guard symbol at the transition in a case where the second unit of the first node transmits signals or channels in the set group other than elements in the third set; or the first node requests the second node to do not reserve the guard symbol at the transition in a case where the second unit of the first node transmits the elements of the first element set, that is, the first node requests the second node to do not reserve the guard symbol at the transition in a case where the second unit of the first node transmits signals or channels in the set group other than elements in the third set.

In an embodiment, the set group includes at least one set, each set corresponds to a serial number; and each set is an empty set or includes at least one of the following elements: a periodic CSI-RS, a SSB, a RACH, a SR or a PDCCH corresponding to a type 0 search space.

In an embodiment, the PDCCH corresponding to the type 0 search space may be a PDCCH corresponding to a type 0 search space defined by the MIB.

For example, the first element set is a set composed of elements in the set group other than elements in the third set. The set group may include one or more sets. The sets having the seral numbers of N1, N2, N3 and N4 respectively in the set group are listed below:

A set having a serial number of N1 includes the following elements: a SSB, a RACH and a PDCCH of the type 0 search space.

A set having a serial number of N2 includes the following elements: a SSB, a RACH, a PDCCH of the type 0 search space and a periodic CSI-RS.

A set having a serial number of N3 includes the following elements: a periodic CSI-RS and a SR.

A set having a serial number of N4 includes the following elements: a SSB, a RACH, a PDCCH of the type 0 search space, a periodic CSI-RS and a SR.

If the third set is the set corresponding to the serial number of N3 and includes the periodic CSI-RS and the SR, the first element set includes a set composed of elements other than the elements of the third set among all elements included in the set group, that is, the first element set includes the SSB, the RACH and the PDCCH of the type 0 search space.

It is to be noted that an empty set may also exist in the set group. If the third set is an empty set in the set group, the first element set essentially includes all elements in the set group.

In an embodiment, the first set, the second set, the third set and the set group may be predefined, or may be determined according to first signaling. The first signaling includes at least one of high layer signaling, physical layer signaling or MAC layer signaling.

In an embodiment, the first set, the second set and the third set belong to the candidate first set, the candidate second set and the candidate third set respectively, and the candidate first set, the candidate second set, and the candidate third set may respectively be predefined (e.g. protocol predefined, or first node-second node agreement) or may be determined by second signaling. In addition, the first set, the second set and the third set may be determined from the candidate first set, the candidate second set and the candidate third set, respectively according to the third signaling. For example, one or more of the candidate first set, the candidate second set, and the candidate third set is determined according to the second signaling, and a corresponding first set, second set, or third set is determined from the candidate sets according to the third signaling. The second signaling includes at least one of high layer signaling, physical layer signaling or MAC layer signaling, and the third signaling includes at least one of high layer signaling, physical layer signaling or MAC layer signaling.

It is to be noted that the above partition of elements of the first set, the second set, the third set and the set group is only an exemplary description. In some embodiments, other signals and/or channels may be added on the basis of the above signals and/or channels, such as channels corresponding to low-delay services, channels corresponding to high-reliability services, channels corresponding to low-delay high-reliability services, channels corresponding to high-priority services, and the like.

In an embodiment, the request information is sent through a media access control control element (MACE) or high layer signaling. The high layer signaling may be radio resource control (RRC) signaling or F1 application protocol (FAP) signaling.

Figures 4, 5, 6:
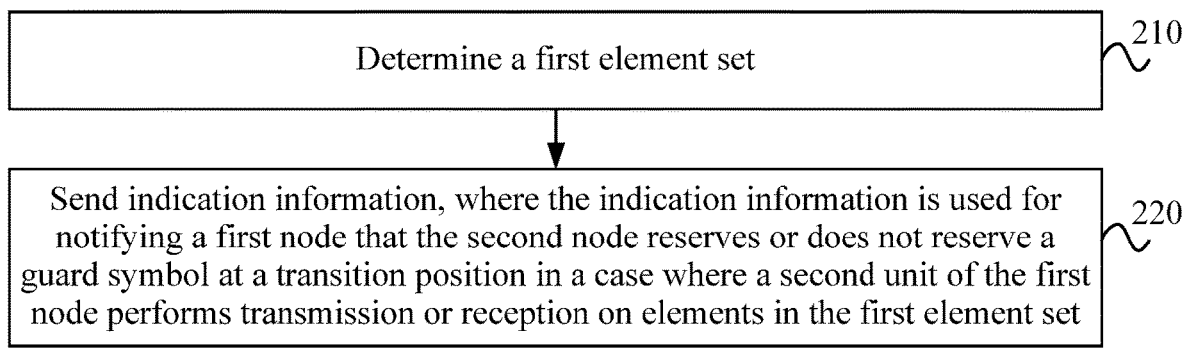
FIG. 4 is a schematic diagram of sending request information through a MAC CE according to an embodiment.
FIG. 5 is a schematic diagram of requesting to reserve or not reserve a guard symbol through a MAC CE according to an embodiment.
FIG. 6 is a flowchart of a symbol reservation method according to another embodiment.

FIG. 4 is a schematic diagram of sending request information through a MAC CE according to an embodiment. As shown in FIG. 4, the first node requests the second node through the MAC CE to reserve or not reserve the guard symbol for transmitting the first element set. The request information may also carry a sub-carrier interval, the number of guard symbols corresponding to eight transition types and several reserved bits, etc. In FIG. 4, each field of NmbGS1 to NmbGS8 corresponds to the number of reserved guard symbols corresponding to one transition type in Table 1.

FIG. 5 is a schematic diagram of requesting to reserve or not reserve a guard symbol through a MAC CE according to an embodiment. As shown in FIG. 5, one reserved bit (denoted as sigChNotify) of the MAC CE is used as an indication field. The indication field occupies one bit and can represent two states, which are recorded as state 1 and state 2, respectively. State 1 and state 2 are distinguishable from each other. For example, state 2 is 0 in a case where state 1 is 1, or state 2 is 1 in a case where state 1 is 0.

The first node sends a MAC CE including the indication field to the second node, and the different states of the indication field represent whether the second node is requested to reserve the guard symbol at the transition in a case where the second unit of the first node performs transmission or reception on elements in the first element set. For example, the indication field is in state 1, representing that the first node requests the second node to reserve the guard symbol at the transition in a case where the second unit of the first node transmits a transmission or reception operation of elements in the first element set, and the indication field is in state 2, representing that the first node does not request the second node to reserve the guard symbol at the transition in a case where the second unit of the first node transmits a transmission or reception operation of elements in the first element set. It is to be noted that the first element set may be an empty set or may be related to at least one of the first set, the second set, the third set or the set group.

In some embodiments, the indication field may also occupy two bits having four values 00, 01, 10 and 11, state 1 and state 2 correspond to two values, and the remaining two values may be reserved. The indication field may also be N bits having $2^N$ values, and one or more specific values of the $2^N$ values may be used for representing whether the first node requests the second node to reserve the guard symbol at the transition in a case where the second unit of the first node transmits the transmission or reception operation of elements in the first element set, and the remaining values may be reserved or indicate other states.

In an embodiment, the indication field in the MAC CE may also be one or more reserved bits in the MAC CE for notifying and requesting the number of reserved guard symbols, or one or more reserved bits in other existing MAC CE, or introduce a MAC CE in which one or more bits of the MAC CE are used as the indication field.

In some embodiments, the indication field may also be used for representing whether the first node requests to know known information about the second node to the first element set, that is, the first node sends the MAC CE including the indication field to the second node to inquire the knowledge about the second node to the first element set. For example, the indication field is in state 1, representing that the first node requests to inquire the known information about the second node to the first element set, and the indication field is in state 2, representing that the first node does not inquire or pay attention to the known information about the second node to the first element set.

In some embodiments, the second node may also notify the first node to reserve or not reserve the guard symbol in what cases through the MAC CE shown in FIG. 5.

In an embodiment, the indication field may also be used for representing the first element set. For example, the indication field is in state 1, representing that the first element set includes a set having the serial number of N1, the indication field is in state 2, representing that the first element set includes a set having the serial number of N2, and the indication field is in state 3, representing that the first element set includes elements other than the set having the serial number of N3 in the set group. On this basis, the first node may request the second node to reserve or not reserve the guard symbol in a case of transmitting the first element set.

In an embodiment, the first node is an IAB node and the second node is a parent node of the first node, and the first unit is a MT of the IAB node and the second unit is a DU of the IAB node. The parent node of the first node may be an eNB station of LTE or an IAB node or a gNB of a new radio (NR).

The present application provides a symbol reservation method. The first node notifies the second node to reserve or not reserve the guard symbol for the transmission of the elements in the first element set at the transition, so as to make clear the reservation condition of the guard symbol and improve the certainty and reliability of reserving the guard symbol. On this basis, the first node can achieve accurate the transition operation.

FIG. 6 is a flowchart of a symbol reservation method according to another embodiment. The method may be applied to a second node. It is to be noted that the operation of which the second node sends indication information in this embodiment and the operation of which the first node sends the request information in the preceding embodiments belong to the same concept. For technical details not described in detail in this embodiment, reference may be made to any one of the preceding embodiments.

As shown in FIG. 6, the method provided in this embodiment includes 210 to 220.

In 210, a first element set is determined.

In 220, indication information is sent, where the indication information is used for notifying a first node that the second node reserves or does not reserve a guard symbol at a transition in a case where a second unit of the first node performs transmission or reception on elements in the first element set.

In this embodiment, the second node notifies the first node that the second node reserves or does not reserve a guard symbol at the transition in a case where the second unit of the first node transmits the elements in the first element set. The reserved protection symbol means that the second node does not schedule the resources (one or several OFDM symbols) corresponding to the first unit of the first node.

In this embodiment, the first element set is used for representing that the second node will perform the guard symbol reservation mechanism in the case where the first node transmits which signal and/or which channel. For example, if the first element set includes a PDCCH of a type 0 search space, the indication information may be used for notifying the first node that the second node reserves the guard symbol at the transition in a case where the second unit of the first node transmits the PDCCH of the type 0 search space, and if the PDCCH transmitted by the second unit of the first node is not the PDCCH of the type 0 search space, the second node does not reserve the guard symbol. For another example, if the first element set includes a SSB, the indication information is used for notifying the first node that the second node does not reserve the guard symbol at the transition in a case where the second unit of the first node transmits the SSB. For another example, if the first element set includes an uplink scheduling request (SR), the request information may be used for requesting the second node to reserve the guard symbol at the transition in a case where the second unit of the first node transmits the SR, and for requesting the second node to do not reserve the guard symbol if the second unit of the first node does not transmit the SR. For another example, if the first element set includes a periodic CSI-RS, the request information may be used for requesting the second node to reserve the guard symbol at the transition in a case where the second unit of the first node transmits the periodic CSI-RS, and for requesting the second node to do not reserve the guard symbol if the second unit of the first node does not transmit the periodic CSI-RS. Therefore, it can be clear under what cases the guard symbol is reserved.

In an embodiment, the first element set may be determined by predefinition (e.g., protocol predefinition or first node-second node agreement), signaling indication, or an interaction combination of predefinition and signaling, where the signaling includes at least one of high layer signaling, physical layer signaling, or MAC layer signaling.

In an embodiment, the transition includes a transition between an operation of a first unit of the first node and an operation of the second unit of the first node, or a transition between an operation of the second unit on a first attribute resource and an operation of the second unit on a second attribute resource, or a transition between a first attribute resource corresponding to the second unit and a second attribute resource corresponding to the second unit.

In an embodiment, the first attribute resource includes at least one of the following: an NA resource, an NIA soft resource, a time unit where an NA resource is located, or a time unit where an NIA soft resource is located; and the second attribute resource includes at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

In an embodiment, the first element set is an empty set, or the first element set includes one of the following: a first set, a second set, which is a subset of the first set, a third set, which is one set of a set group, a set composed of elements in the first set other than elements in the second set, or a set composed of elements in the set group other than elements in the third set.

It is to be noted that in this embodiment, the first element set, the first set, the second set, the third set and each set in the set group are sets composed of signals and/or channels transmitted by the second unit of the first node, if each set is a non-empty set, the elements thereof include signals and/or channels, and transmitting the elements in the first element set includes sending the elements in the first element set or receiving the elements in the first element set.

For example, the first element set is the empty set. In this case, the first node notifies the second node to reserve the guard symbol at the transition in a case where the second unit of the first node transmits the elements in the first element set, that is, the second node does not reserve the guard symbol at the transition regardless of any signal or channel transmitted by the second unit of the first node; or the second node notifies the first node to do not reserve the guard symbol at the transition in a case where the second unit of the first node transmits the elements in the first element set, that is, the second node reserves the guard symbol at the transition regardless of any signal or channel transmitted by the second unit of the first node.

For example, the first element set is the first set. In this case, the second node notifies the first node to reserve the guard symbol at the transition in a case where the second unit of the first node transmits the elements of the first element set, that is, the second node reserves the guard symbol at the transition in a case where the second unit of the first node transmits signals or channels of the first set; or the second node notifies the first node to do not reserve the guard symbol at the transition in a case where the second unit of the first node transmits the elements of the first element set, that is, the second node does not reserve the guard symbol at the transition in a case where the second unit of the first node transmits signals or channels of the first set.

In an embodiment, the first set is an empty set (this is consistent with the case where the first element set is an empty set), or the first set includes at least one of the following: a periodic CSI-RS, a SSB, a RACH, a SR or a PDCCH corresponding to a type 0 search space.

In an embodiment, the PDCCH corresponding to the type 0 search space may be a PDCCH corresponding to a type 0 search space defined by the MIB.

For example, the first element set includes the second set, and the second set is a subset of the first set. This case may be understood to mean that in one first set, signals and/or channels are further selected to form a second set as a basis that the second node reserves or does not reserve symbols. In this case, the second node notifies the first node to reserve the guard symbol at the transition in a case where the second unit of the first node transmits the elements of the first element set, that is, the second node reserves the guard symbol at the transition in a case where the second unit of the first node transmits signals or channels of the second set; or the second node notifies the first node to do not reserve the guard symbol at the transition in a case where the second unit of the first node transmits the elements of the first element set, that is, the second node does not reserve the guard symbol at the transition in a case where the second unit of the first node transmits signals or channels of the second set.

For example, the first element set is a third set, and the third set is a set of the set group. This case may be understood to mean that in one set group, one set is further selected to form the third set as a basis that the second node reserves or does not reserve symbols. In this case, the second node notifies the first node to reserve the guard symbol at the transition in a case where the second unit of the first node transmits the elements of the first element set, that is, the second node reserves the guard symbol at the transition in a case where the second unit of the first node transmits signals or channels of the third set; or the second node notifies the first node to do not reserve the guard symbol at the transition in a case where the second unit of the first node transmits the elements of the first element set, that is, the second node does not reserve the guard symbol at the transition in a case where the second unit of the first node transmits signals or channels of the third set.

For example, the first element set is a set composed of elements remaining in the first set except the elements in the second set. This case may be understood to mean that elements remaining after the elements in the second set are removed from the first set are served as a basis that the second node reserves or does not reserve symbols. In this case, the second node notifies the first node to reserve the guard symbol at the transition in a case where the second unit of the first node transmits the elements of the first element set, that is, the second node reserves the guard symbol at the transition in a case where the second unit of the first node transmits signals or channels in the first set other than elements in the second set; or the second node notifies the first node to do not reserve the guard symbol at the transition in a case where the second unit of the first node transmits the elements of the first element set, that is, the second node does not reserve the guard symbol at the transition in a case where the second unit of the first node transmits signals or channels in the first set other than elements in the second set.

For example, the first element set is a set composed of elements remaining in the set group except the elements in the third set. This case may be understood to mean that elements remaining after the elements in the third set are removed from the set group are served as a basis that the second node reserves or does not reserve symbols. In this case, the second node notifies the first node to reserve the guard symbol at the transition in a case where the second unit of the first node transmits the elements of the first element set, that is, the second node reserves the guard symbol at the transition in a case where the second unit of the first node transmits signals or channels in the set group other than elements in the third set; or the second node notifies the first node to do not reserve the guard symbol at the transition in a case where the second unit of the first node transmits the elements of the first element set, that is, the second node does not reserve the guard symbol at the transition in a case where the second unit of the first node transmits signals or channels in the set group other than elements in the third set.

In an embodiment, the set group includes at least one set, each set corresponds to a serial number; and each set is an empty set or includes at least one of the following: a periodic CSI-RS, a SSB, a RACH, a SR or a PDCCH corresponding to a type 0 search space.

In an embodiment, the first set, the second set, the third set and the set group are predefined respectively, or are determined according to the first signaling.

In an embodiment, the first set, the second set and the third set belong to the candidate first set, the candidate second set and the candidate third set respectively, the candidate first set, the candidate second set, and the candidate third set are be predefined or determined according to the second signaling, and the first set, the second set and the third set are respectively determined from the candidate first set, the candidate second set and the candidate third set according to the third signaling.

In an embodiment, the indication information is sent through the MAC CE signaling or the high layer signaling. The high layer signaling may be RRC signaling or F1-AP signaling.

As shown in FIG. 4, the second node indicates the first node through the MAC CE to reserve or not reserve the guard symbol for transmitting the first element set. The indication information may also carry a sub-carrier interval, the number of guard symbols corresponding to eight transition types and several reserved bits, etc. In FIG. 4, each field of NmbGS1 to NmbGS8 corresponds to the number of reserved guard symbols corresponding to one transition type in Table 1.

As shown in FIG. 5, one reserved bit (denoted as sigChNotify) of the MAC CE is used as an indication field. The indication field occupies one bit and can represent two states, which are recorded as state 1 and state 2, respectively. State 1 and state 2 are distinguishable from each other. For example, state 2 is 0 in a case where state 1 is 1, or state 2 is 1 in a case where state 1 is 0.

The second node sends a MAC CE including the indication field to the first node, the different states of the indication field represent whether the second node reserves the guard symbol at the transition in a case where the second unit of the first node performs transmission or reception on elements in the first element set. For example, the indication field is in state 1, representing that the second node reserves the guard symbol at the transition in a case where the second unit of the first node transmits a transmission or reception operation of elements in the first element set, and the indication field is in state 2, representing that the second node does not reserve the guard symbol at the transition in a case where the second unit of the first node transmits a transmission or reception operation of elements in the first element set. It is to be noted that the first element set may be an empty set or may be related to at least one of the first set, the second set, the third set or the set group.

In some embodiments, the indication field may also occupy two bits having four values 00, 01, 10 and 11, state 1 and state 2 correspond to two values, and the remaining two values may be reserved. The indication field may also be N bits having $2^N$ values, and one or more specific values of the $2^N$ values may be used for representing whether the second node reserves the guard symbol at the transition in a case where the second unit of the first node transmits the transmission or reception operation of elements in the first element set, and the remaining values may be reserved or indicate other states.

In an embodiment, the indication field in the MAC CE may also be one or more reservation bits in the MAC CE for notifying and requesting the number of reserved guard symbols, or one or more reservation bits in other existing MAC CE, or introduce a MAC CE in which one or more bits of the MAC CE are used as the indication field.

In an embodiment, the indication field may also be used for representing the first element set. For example, the indication field is in state 1, representing that the first element set is a set having the serial number of N1, the indication field is in state 2, representing that the first element set is a set having the serial number of N2, and the indication field is in state 3, representing that the first element set includes elements other than the set having the serial number of N3 in the set group. On this basis, the second node notifies to reserve or not reserve the guard symbol at the transition in a case of transmitting the first element set.

In an embodiment, the first node is an IAB node and the second node is a parent node of the first node, and the first unit is a MT of the IAB node and the second unit is a DU of the IAB node.

The embodiment of the present application provides an inquiry method, the first node inquires the second node about the knowledge of the first element set, so as to make clear that the second node will reserve the guard symbol for which signal and/or channel, and to improve the certainty and reliability of symbol reservation. It is to be noted that in this embodiment, the first node inquires known information about the second node to the first element set, which belongs to the same concept with the operation of the first node requesting the second node to reserve the guard symbol for transmitting the first element set in the above embodiment, and is designed to make clear the case under which the guard symbol will be reserved, thus improving the certainty and reliability of the symbol reservation mechanism. For technical details not described in detail in the embodiment, reference may be made to any one of the preceding embodiments.

Figure 7:
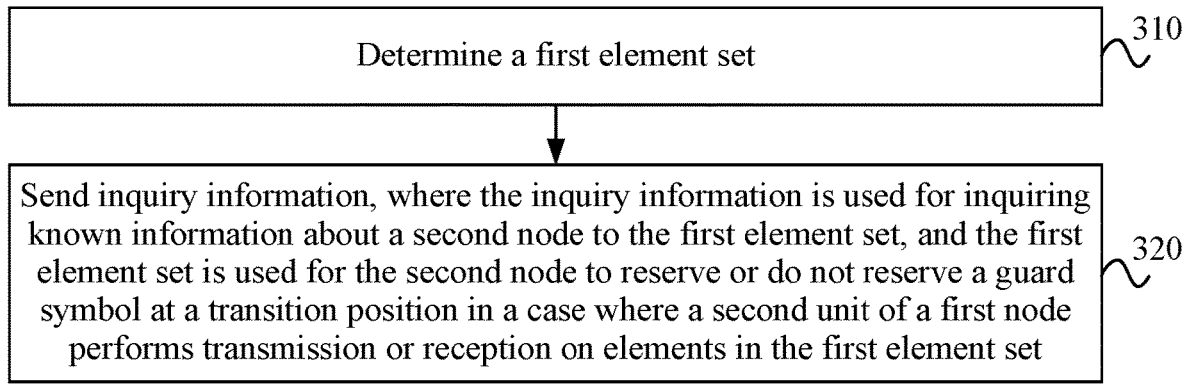
FIG. 7 is a flowchart of an inquiry method according to an embodiment.

FIG. 7 is a flowchart of an inquiry method according to an embodiment, and the method may be applied to the first node. As shown in FIG. 7, the method provided in this embodiment includes 310 to 320.

In 310, a first element set is determined.

In 320, inquiry information is sent, where the inquiry information is used for inquiring known information about a second node to the first element set, and the first element set is used for the second node to reserve or not reserve a guard symbol at a transition in a case where a second unit of the first node performs transmission or reception on elements in the first element set.

In this embodiment, the first node inquires whether the second node knows the related configuration of the first element set. For example, the first node inquires whether the second node knows the configuration of part or all of elements in the first element set corresponding to the second unit of the first node.

In some embodiment, the first node may also notify the second node through the inquiry information that the first node does not pay attention to known information about the second node to the first element set.

In an embodiment, the first element set is an empty set, or the first element set is one of the following: a first set, a second set, which is a subset of the first set, a third set, which is one set of a set group, a set composed of elements remaining in the first set other than elements in the second set, or a set composed of elements remaining in the set group other than elements in the third set.

For example, the first node inquires whether the second node knows the related configuration of the third set having the serial number of Ni in the set group through high layer signaling. The number of serial numbers is greater than the number of sets in the set group. For example, if the set group includes four sets, the value of Ni may provide at least four serial numbers to index different sets of the set group. The high layer signaling may be RRC signaling or F1-AP signaling.

In an embodiment, the first element set is a signal and/or channel, and includes at least one of the following: a periodic CSI-RS, a SSB, a RACH, a SR or a PDCCH corresponding to a type 0 search space.

It is to be noted that in this embodiment, the first element set, the first set, the second set, the third set and each set in the set group are sets composed of signals and/or channels transmitted by the second unit of the first node, if each set is a non-empty set, the elements thereof include signals and/or channels, and transmitting the elements in the first element set includes sending the elements in the first element set or receiving the elements in the first element set.

For example, the first element set is the empty set. In this case, the first node inquires the known information about the second node to the first element set, or the first node notifies the second node that the first node does not pay attention to the known information about the second node to the first element set.

For example, the first element set is the first set. In this case, the first node inquires the known information about the second node to signals and/or channels of the first set, or the first node notifies the second node that the first node does not pay attention to the known information about the second node to signals and/or channels of the first set.

In an embodiment, the first set is an empty set (this is consistent with the case where the first element set is an empty set), or the first set includes at least one of the following: a periodic CSI-RS, a SSB, a RACH, a SR or a PDCCH corresponding to a type 0 search space.

For example, the first element set is the second set, and the second set is a subset of the first set. This case may be understood to mean that in one first set, some signals and/or channels are further selected to form a second set as a basis for inquiring the second node. In this case, the first node inquires the known information about the second node to signals and/or channels of the second set, or the first node notifies the second node that the first node does not pay attention to the known information about the second node to signals and/or channels of the second set.

For example, the first element set is a third set, and the third set is a set of the set group. This case may be understood to mean that in one set group, signals and/or channels are further selected to form a third set as a basis for inquiring the second node. In this case, the first node inquires the known information about the second node to signals and/or channels of the third set, or the first node notifies the second node that the first node does not pay attention to the known information about the second node to signals and/or channels of the third set.

For example, the first element set is a set composed of signals and/or channels remaining in the first set except the second set. This case may be understood to mean that the set composed of remaining signals and/or channels in the first set excluding the second set is served as a basis for inquiring the second node. In this case, the first node inquires the known information about the second node to signals and/or channels of the first set except signals and/channel in the second set, or the first node notifies the second node that the first node does not pay attention to the known information about signals and/or channels remaining in the first set except the second set.

For example, the first element set is a set composed of signals and/or channels remaining in the set group except the third set. This case may be understood to mean that the set composed of remaining signals and/or channels in the set group excluding the third set is served as a basis for inquiring the second node. In this case, the first node inquires the known information about the second node to signals and/or channels remaining in the set group except the third set, or the first node notifies the second node that the first node does not pay attention to the known information about remaining signals and/or channels in the set group except the third set.

As shown in FIG. 4, the first node inquires known information about the second node to the first element set through the MAC CE. The indication information may also carry a sub-carrier interval, the number of guard symbols corresponding to eight transition types and several reserved bits, etc.

As shown in FIG. 5, one reserved bit (denoted as sigChNotify) of the MAC CE is used as an indication field. The indication field occupies one bit and can represent two states, which are recorded as state 1 and state 2, respectively. State 1 and state 2 are distinguishable from each other. For example, state 2 is 0 in a case where state 1 is 1, or state 2 is 1 in a case where state 1 is 0.

The first node sends a MAC CE including the indication field to the second node, the different states of the indication field represent whether the first node inquires the known information about the second node to the first element set. For example, the indication field is in state 1, representing that the first node inquires the known information about the second node to the first element set, and the indication field is in state 2, representing that the first node does not pay attention to the known information about the second node to the first element set. It is to be noted that the first element set may be an empty set or may be related to at least one of the first set, the second set, the third set or the set group.

In some embodiments, the indication field may also occupy two bits having four values 00, 01, 10 and 11, state 1 and state 2 correspond to two values, and the remaining two values may be reserved. The indication field may also be N bits having $2^N$ values, and one or more specific values of the $2^N$ values may be used for representing whether the first node inquires the known information about the first element set, and the remaining values may be reserved or indicate other states.

In an embodiment, the indication field in the MAC CE may also be one or more reservation bits in the MAC CE for notifying and requesting the number of reserved guard symbols, or one or more reservation bits in other existing MAC CE, or introduce a MAC CE in which one or more bits of the MAC CE are used as the indication field.

In an embodiment, the indication field may also be used for representing the first element set. For example, the indication field is in state 1, representing that the first element set is a set having the serial number of N1, the indication field is in state 2, representing that the first element set is a set having the serial number of N2, and the indication field is in state 3, representing that the first element set is a set having the serial number of N3, etc. On this basis, the first node can determine the known information about the second node to the first element set.

In an embodiment, the transition includes a transition between an operation of a first unit of the first node and an operation of the second unit of the first node, or a transition between an operation of the second unit on a first attribute resource and an operation of the second unit on a second attribute resource, or a transition between a first attribute resource of the second unit and a second attribute resource of the second unit.

In an embodiment, the first attribute resource includes at least one of the following: an NA resource, an NIA soft resource, a time unit where an NA resource is located, or a time unit where an NIA soft resource is located; and the second attribute resource includes at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

In an embodiment, the first node is an IAB node and the second node is a parent node of the first node, and the first unit is a MT of the IAB node and the second node is a DU of the IAB node.

In an embodiment, signals and/or channels included in the first element set are predefined or are determined according to signaling. The signaling includes at least one of first signaling, second signaling or third signaling, and may be specifically high layer signaling, physical layer signaling, MAC layer signaling or the like.

The embodiment of the present application further provides a notification method, the second node notifies the known information about the first node to the first element set, so as to make clear that the second node will reserve the guard symbol for which element, and to improve the certainty and reliability of symbol reservation. It is to be noted that in this embodiment, the second node notifies the known information about the second node to the first element set, which belongs to the same concept with the operation of the first node inquiring the known information about the second node to the first element set in the above embodiment, and is designed to make clear the case under which the guard symbol will be reserved, thus improving the certainty and reliability of the symbol reservation mechanism. For technical details not described in detail in the embodiment, reference may be made to any one of the preceding embodiments.

Figure 8:
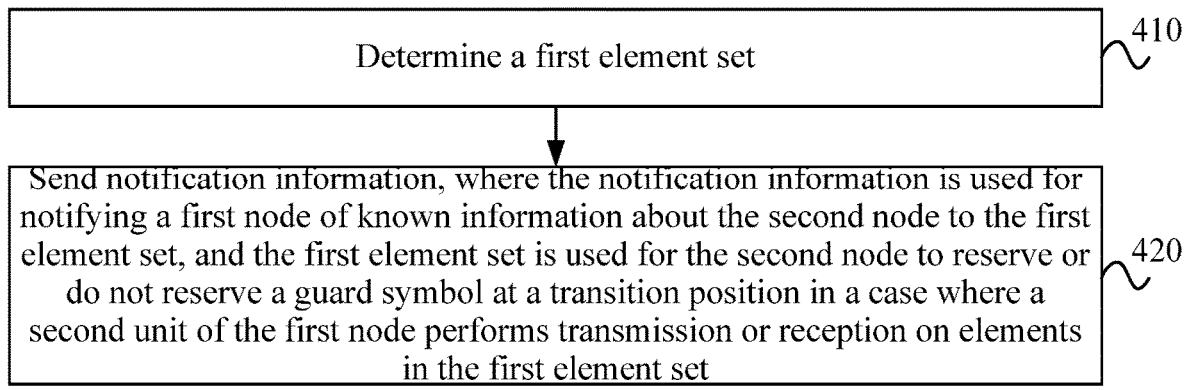
FIG. 8 is a flowchart of a notification method according to an embodiment.

FIG. 8 is a flowchart of a notification method according to an embodiment. As shown in FIG. 8, the method provided in this embodiment includes 410 and 420.

In 410, a first element set is determined.

In 420, notification information is sent, where the notification information is used for notifying a first node of known information about the second node to the first element set, and the first element set is used for the second node to reserve or not reserve a guard symbol at a transition in a case where a second unit of the first node performs transmission or reception on elements in the first element set.

In this embodiment, the second node notifies whether the first node knows the related configuration of the first element set. For example, the second node notifies whether the first node knows the configuration of part or all of elements in the first element set corresponding to the second unit of the first node.

In an embodiment, the first element set is an empty set, or the first element set is one of the following: a first set, a second set, which is a subset of the first set, a third set, which is one set of a set group, a set composed of elements remaining in the first set other than the second set, or a set composed of elements remaining in the set group other than the third set.

For example, the second node notifies whether the first node knows the related configuration of the third set having the serial number of Ni in the set group through high layer signaling. The number of serial numbers is greater than the number of sets in the first set group. For example, if the set group includes four sets, the value of Ni may provide at least four serial numbers to index different sets of the first set group. The high layer signaling may be RRC signaling or F1-AP signaling.

In an embodiment, the first element set is an empty set, or includes at least one of the following: a periodic CSI-RS, a SSB, a RACH, a SR or a PDCCH corresponding to a type 0 search space.

It is to be noted that in this embodiment, the first element set, the first set, the second set, the third set and each set in the set group are sets composed of signals and/or channels transmitted by the second unit of the first node, if each set is a non-empty set, the elements thereof include signals and/or channels, and transmitting the elements in the first element set includes sending the elements in the first element set or receiving the elements in the first element set.

For example, the first element set is the empty set. In this case, the second node notifies the known information about the first node to the first element set.

For example, the first element set is the first set. In this case, the second node notifies the known information about the first node to signals and/or channels in the first element set.

In an embodiment, the first set is an empty set (this is consistent with the case where the first element set is an empty set), or the first set includes at least one of the following: a periodic CSI-RS, a SSB, a RACH, a SR or a PDCCH corresponding to a type 0 search space.

For example, the first element set is the second set, and the second set is a subset of the first set. This case may be understood to mean that in one first set, some signals and/or channels are further selected to form a second set. In this case, the second node notifies the known information about the first node to signals and/or channels in the second set.

For example, the first element set is a third set, and the third set is a set of the set group. This case may be understood to mean that in one set group, one set is further selected to form a third set. In this case, the second node notifies the known information about the first node to signals and/or channels in the third set.

For example, the first element set is a set composed of signals and/or channels remaining in the first set except the second set. This case may be understood to mean that signals and/or channels are remained after the elements in the second set are removed from the first set. In this case, the second node notifies the known information about the first node to signals and/or channels remaining in the first set except the second set.

For example, the first element set is a set composed of signals and/or channels remaining in the set group except the third set. This case may be understood to mean that signals and/or channels are remained after the third set is removed from the set group. In this case, the second node notifies the known information about the first node to signals and/or channels remaining in the set group except the third set.

In an embodiment, the notification information is sent through the MAC CE signaling or the high layer signaling. The high layer signaling may be RRC signaling or F1-AP signaling.

As shown in FIG. 4, the second node notifies known information about the first node to elements in the first element set through the MAC CE. The notification information may also carry a sub-carrier interval, the number of guard symbols corresponding to eight transition types and several reserved bits, etc.

As shown in FIG. 5, one reserved bit (denoted as sigChNotify) of the MAC CE is used as an indication field. The indication field occupies one bit and can represent two states, which are recorded as state 1 and state 2, respectively. State 1 and state 2 are distinguishable from each other. For example, state 2 is 0 in a case where state 1 is 1, or state 2 is 1 in a case where state 1 is 0.

The second node sends a MAC CE including the indication field to the first node, and the indication field is used for notifying the known information about the first node to the elements in first element set. For example, the indication field is in state 1, representing that the second node notifies the known information about the elements in the first element set, and the indication field is in state 2, representing that the second node does not know the first element set. It is to be noted that the first element set may be an empty set or may be related to at least one of the first set, the second set, the third set or the set group.

In some embodiments, the indication field may also occupy two bits having four values 00, 01, 10 and 11, state 1 and state 2 correspond to two values, and the remaining two values may be reserved. The indication field may also be N bits having $2^N$ values, and one or more specific values of the $2^N$ values may be used for representing whether the second node notifies or pays attention to the known information about the elements in the first element set, and the remaining values may be reserved or indicate other states.

In an embodiment, the indication field in the MAC CE may also adopt one or more reserved bits in the MAC CE for notifying and requesting the number of reserved guard symbols, or one or more reservation bits in other existing MAC CE, or introduce a MAC CE in which one or more bits of the MAC CE are used as the indication field.

In an embodiment, the indication field may also be used for representing the first element set. For example, the indication field is in state 1, representing that the first element set includes a set having the serial number of N1, the indication field is in state 2, representing that the first element set includes a set having the serial number of N2, and the indication field is in state 3, representing that the first element set includes elements other than the set having the serial number of N3 in the set group. On this basis, the second node notifies to reserve or not reserve the guard symbol in a case of transmitting the first element set.

In an embodiment, the transition includes a transition between an operation of a first unit of the first node and an operation of the second unit of the first node; or a transition between an operation of the second unit on a first attribute resource and an operation of the second unit on a second attribute resource; or a transition between a first attribute resource corresponding to the second unit and a second attribute resource corresponding to the second unit.

The first attribute resource includes at least one of the following: an NA resource, an NIA soft resource, a time unit where an NA resource is located, or a time unit where an NIA soft resource is located.

The second attribute resource includes at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

In an embodiment, the first node is an IAB node, and the second node is a parent node of the first node.

The first unit is a MT of the IAB node, and the second node is a DU of the IAB node.

In an embodiment, the elements included in the first element set are predefined or are determined according to signaling. The signaling includes at least one of first signaling, second signaling or third signaling, and may be specifically high layer signaling, physical layer signaling, MAC layer signaling or the like.

Figure 9:
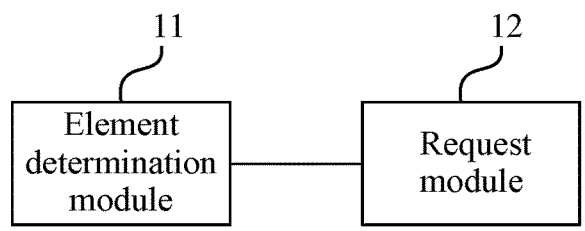
FIG. 9 is a structural diagram of a resource symbol reservation apparatus according to an embodiment.

Embodiments of the present application further provide a symbol reservation apparatus. FIG. 9 is a structural diagram of a resource symbol reservation apparatus according to an embodiment. As shown in FIG. 9, the symbol reservation apparatus includes: an element determination module 11 and a request module 12.

The element determination module 11 is configured to determine a first element set.

The request module 12 is configured to send request information, where the request information is used for requesting to reserve or not reserve a guard symbol at a transition in a case where a second unit of the first node performs transmission or reception on elements in the first element set.

According to the symbol reservation apparatus in this embodiment, the second node reserves or does not reserve the guard symbol for the transmission of the elements in the first element set at the transition, so as to make clear the reservation condition of the guard symbol and improve the certainty and reliability of reserving the guard symbol. On this basis, the first node can achieve accurate the transition operation.

In an embodiment, the transition includes a transition between an operation of a first unit of the first node and an operation of the second unit of the first node; or a transition between an operation of the second unit on a first attribute resource and an operation of the second unit on a second attribute resource; or a transition between a first attribute resource corresponding to the second unit and a second attribute resource corresponding to the second unit.

In an embodiment, the first attribute resource includes at least one of the following: an NA resource, an NIA soft resource, a time unit where an NA resource is located, or a time unit where an NIA soft resource is located.

The second attribute resource includes at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

In an embodiment, the first element set is an empty set, or the first element set is one of the following: a first set, a second set, which is a subset of the first set, a third set, which is one set of a set group, a set composed of elements remaining in the first set other than the second set, or a set composed of elements remaining in the set group other than the third set.

In an embodiment, the first set is the empty set, or the first set includes at least one of a periodic CSI-RS, a SSB, a RACH, a SR or a PDCCH corresponding to a type 0 search space.

In an embodiment, the set group includes at least one set, and each set of the at least one set corresponds to a serial number.

Each set is an empty set or includes at least one of the following elements: a periodic CSI-RS, a SSB, a RACH, a SR or a PDCCH corresponding to a type 0 search space.

In an embodiment, the first set, the second set, the third set and the set group are predefined respectively, or are determined according to the first signaling.

In an embodiment, the first set, the second set, and the third set belong to the candidate first set, the candidate second set and the candidate third set respectively.

The candidate first set, the candidate second set and the candidate third set are predefined or determined according to second signaling.

The first set, the second set and the third set are determined from the candidate first set, the candidate second set and the candidate third set, respectively according to the third signaling.

In an embodiment, the request information is sent through the MAC CE signaling or the high layer signaling.

In an embodiment, the first node is an IAB node, and the second node is a parent node of the first node.

The first unit is a MT of the IAB node, and the second unit is a DU of the IAB node.

The symbol reservation apparatus provided in this embodiment and the symbol reservation method applied to the first node provided in the preceding embodiments belong to the same concept. For technical details not described in detail in this embodiment, reference may be made to any one of the preceding embodiments.

Figure 10:
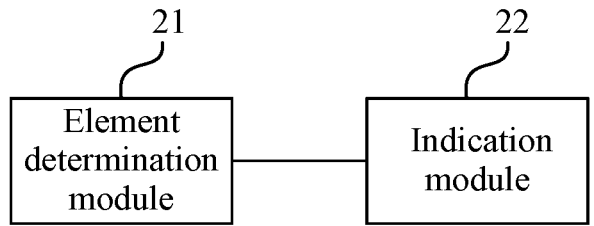
FIG. 10 is a structural diagram of a resource symbol reservation apparatus according to another embodiment.

FIG. 10 is a structural diagram of a resource symbol reservation apparatus according to another embodiment. As shown in FIG. 10, the symbol reservation apparatus includes: an element determination module 21 and an indication module 22.

The element determination module 21 is configured to determine a first element set.

The indication module 22 is configured to send indication information, where the indication information is used for notifying a first node that the second node reserves or does not reserve a guard symbol at a transition in a case where a second unit of the first node performs transmission or reception on elements in the first element set.

According to the symbol reservation apparatus in this embodiment, the first node is notified that the guard symbol is reserved or is not reserved for the transmission of the elements in the first element set at the transition, so as to make clear the reservation condition of the guard symbol and improve the certainty and reliability of reserving the guard symbol. On this basis, the first node can achieve timing alignment and accurate the transition operation.

In an embodiment, the transition includes a transition between an operation of a first unit of the first node and an operation of the second unit of the first node; or a transition between an operation of the second unit on a first attribute resource and an operation of the second unit on a second attribute resource; or a transition between a first attribute resource corresponding to the second unit and a second attribute resource corresponding to the second unit.

In an embodiment, the first attribute resource includes at least one of the following: an NA resource, an NIA soft resource, a time unit where an NA resource is located, or a time unit where an NIA soft resource is located.

The second attribute resource includes at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

In an embodiment, the first element set is an empty set, or the first element set is one of the following: a first set, a second set, which is a subset of the first set, a third set, which is one set of a set group, a set composed of elements remaining in the first set other than the second set, or a set composed of elements remaining in the set group other than the third set.

In an embodiment, the first set is the empty set, or the first set includes at least one of a periodic CSI-RS, a SSB, a RACH, a SR or a PDCCH corresponding to a type 0 search space.

In an embodiment, the set group includes at least one set, and each set of the at least one set corresponds to a serial number.

Each set is an empty set or includes at least one of the following: a periodic CSI-RS, a SSB, a RACH, a SR or a PDCCH corresponding to a type 0 search space.

In an embodiment, the first set, the second set, the third set and the set group are predefined respectively, or are determined according to the first signaling.

In an embodiment, the first set, the second set, and the third set belong to the candidate first set, the candidate second set and the candidate third set respectively.

The candidate first set, the candidate second set and the candidate third set are predefined or determined according to second signaling.

The first set, the second set and the third set are determined from the candidate first set, the candidate second set and the candidate third set, respectively according to the third signaling.

In an embodiment, the indication information is sent through the MAC CE signaling or the high layer signaling.

In an embodiment, the first node is an IAB node and the second node is a parent node of the first node, and the first unit is a MT of the IAB node and the second node is a DU of the IAB node.

The symbol reservation apparatus provided in this embodiment and the symbol reservation method applied to the second node provided in the preceding embodiments belong to the same concept. For technical details not described in detail in this embodiment, reference may be made to any one of the preceding embodiments.

Figure 11:
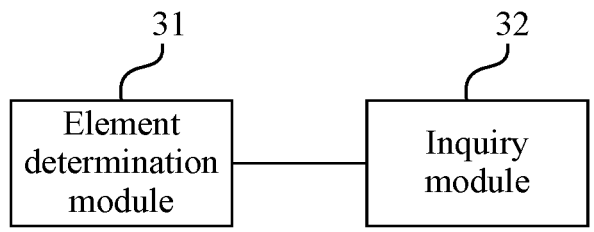
FIG. 11 is a structural diagram of an inquiry apparatus according to an embodiment.

Embodiments of the present application further provide an inquiry apparatus. FIG. 11 is a structural diagram of an inquiry apparatus according to an embodiment. As shown in FIG. 11, the symbol reservation apparatus includes: an element determination module 31 and an inquiry module 32.

The element determination module 31 is configured to determine a first element set.

The inquiry module 32 is configured to send inquiry information, where the inquiry information is used for inquiring known information about a second node to the first element set, and the first element set is used for the second node to reserve or not reserve a guard symbol at a transition in a case where a second unit of a first node performs transmission or reception on elements in the first element set.

According to the symbol reservation apparatus, the known information about the second node to the first element set is inquired, so that it is clear that the second node will reserve the guard symbol for which element, and the certainty and reliability of symbol reservation are improved.

In an embodiment, the transition includes a transition between an operation of a first unit of the first node and an operation of the second unit of the first node; or a transition between an operation of the second unit on a first attribute resource and an operation of the second unit on a second attribute resource; or a transition between a first attribute resource corresponding to the second unit and a second attribute resource corresponding to the second unit.

In an embodiment, the first attribute resource includes at least one of the following: an NA resource, an NIA soft resource, a time unit where an NA resource is located, or a time unit where an NIA soft resource is located.

The second attribute resource includes at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

In an embodiment, the first element set is an empty set, or the first element set is one of the following: a first set, a second set, which is a subset of the first set, a third set, which is one set of a set group, a set composed of elements remaining in the first set other than the second set, or a set composed of elements remaining in the set group other than the third set.

In an embodiment, the first element set is the empty set, or the first element set includes at least one of a periodic CSI-RS, a SSB, a RACH, a SR or a PDCCH corresponding to a type 0 search space.

In an embodiment, the first node is an IAB node, and the second node is a parent node of the first node.

The first unit is a MT of the IAB node, and the second node is a DU of the IAB node.

In an embodiment, the elements included in the first element set are predefined or are determined according to signaling.

The symbol reservation apparatus provided in this embodiment and the symbol reservation method provided in the preceding embodiments belong to the same concept. For technical details not described in detail in this embodiment, reference may be made to any one of the preceding embodiments.

Figure 12:
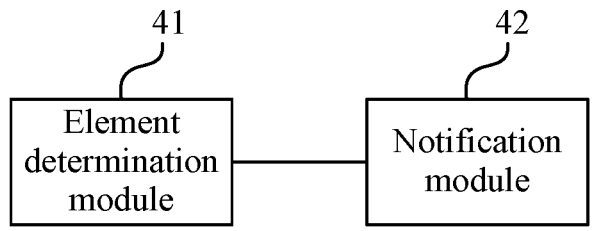
FIG. 12 is a structural diagram of a notification apparatus according to an embodiment.

Embodiments of the present application further provide a notification apparatus. FIG. 12 is a structural diagram of a notification apparatus according to an embodiment. As shown in FIG. 12, the symbol reservation apparatus includes: an element determination module 41 and a notification module 42.

The element determination module 41 is configured to determine a first element set.

The notification module 42 is configured to send notification information, where the notification information is used for notifying a first node of known information about the second node to the first element set, and the first element set is used for the second node to reserve or not reserve a guard symbol at a transition in a case where a second unit of the first node performs transmission or reception on elements in the first element set.

According to the symbol reservation apparatus, the known information about the second node to the first element set is notified, so that it is clear that the second node will reserve the guard symbol for which element, and the certainty and reliability of symbol reservation are improved.

In an embodiment, the first element set is the empty set, or the first element set includes at least one of signals or channels.

In an embodiment, the transition includes a transition between an operation of a first unit of the first node and an operation of the second unit of the first node; or a transition between an operation of the second unit on a first attribute resource and an operation of the second unit on a second attribute resource; or a transition between a first attribute resource corresponding to the second unit and a second attribute resource corresponding to the second unit.

In an embodiment, the first attribute resource includes at least one of the following: an NA resource, an NIA soft resource, a time unit where an NA resource is located, or a time unit where an NIA soft resource is located.

The second attribute resource includes at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

In an embodiment, the first element set is an empty set, or the first element set is one of the following: a first set, a second set, which is a subset of the first set, a third set, which is one set of a set group, a set composed of elements remaining in the first set other than the second set, or a set composed of elements remaining in the set group other than the third set.

In an embodiment, the first element set is the empty set, or the first element set includes at least one of a periodic CSI-RS, a SSB, a RACH, a SR or a PDCCH corresponding to a type 0 search space.

In an embodiment, the first node is an IAB node, and the second node is a parent node of the first node.

The first unit is a MT of the IAB node, and the second node is a DU of the IAB node.

In an embodiment, the elements included in the first element set are predefined or are determined according to signaling.

The symbol reservation apparatus provided in this embodiment and the symbol reservation method provided in the preceding embodiments belong to the same concept. For technical details not described in detail in this embodiment, reference may be made to any one of the preceding embodiments.

Embodiments of the present application further provide a first node. The symbol reservation method applied to the first node may be performed by a symbol reservation apparatus which may be implemented by software and/or hardware and integrated in the first node. The inquiry method may be performed by the inquiry apparatus which may be implemented by software and/or hardware and integrated in the first node. The first node is an IAB node.

Figure 13:
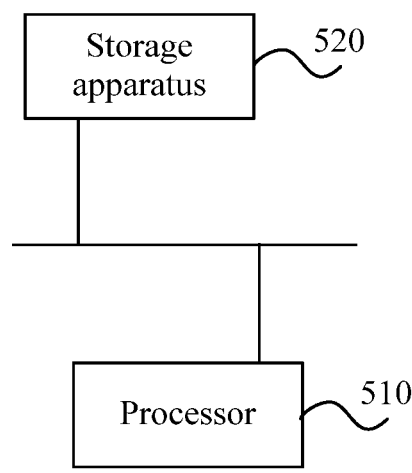
FIG. 13 is a structural diagram of hardware of a first node according to an embodiment.

FIG. 13 is a structural diagram of hardware of a first node according to an embodiment. As shown in FIG. 13, the first node provided in this embodiment includes a processor 510 and a storage apparatus 520. The first node may include one or more processors. One processor 510 is shown as an example in FIG. 13. The processor 510 and the storage apparatus 520 in the device may be connected via a bus or other manners. The connection via a bus is shown as an example in FIG. 13.

When executed by the one or more processors 510, the one or more programs cause the one or more processors to implement the symbol reservation method and the inquiry method applied to the first node according to any embodiment described above.

The storage apparatus 520 in the first node, as a computer-readable storage medium, may be configured to store one or more programs which may be software programs, computer-executable programs and modules, such as program instructions/modules (for example, modules in the symbol reservation apparatus, including an element determination module 11 and a request module 12, as shown in FIG. 9) corresponding to the symbol reservation method applied to the first node in embodiments of the present application. The processor 510 executes software programs, instructions, and modules stored in the storage apparatus 520 to perform various function applications and data processing of the first node, that is, to implement the symbol reservation method in the preceding method embodiments.

The storage apparatus 520 mainly includes a program storage region and a data storage region. The program storage region may store an operating system and an application program required by at least one function. The data storage region may store data (such as the first element set and request information in the preceding embodiments) created based on use of the device. In addition, the storage apparatus 520 may include a high-speed random-access memory and may further include a nonvolatile memory, such as at least one disk memory, a flash memory, or another nonvolatile solid-state memory. In some examples, the storage apparatus 520 may further include memories remotely disposed relative to the processor 510, and these remote memories may be connected to the first node via a network. Examples of the above network include, but are not limited to, the Internet, an intranet, a local area network, a mobile communication network and a combination thereof.

Moreover, the one or more programs included in the preceding first node, when executed by the one or more processors 510, implement the following operations: determining a first element set; and sending request information, where the request information is used for requesting to reserve or not reserve a guard symbol at a transition in a case where a second unit of the first node performs transmission or reception on elements in the first element set.

also implement the following operations: determining a first element set; and sending inquiry information, where the inquiry information is used for inquiring known information about a second node to the first element set, and the first element set is used for the second node to reserve or not reserve a guard symbol at a transition in a case where a second unit of the first node performs transmission or reception on elements in the first element set.

The first node provided in this embodiment and the symbol reservation method or inquiry method applied to the first node provided in the preceding embodiments belong to the same concept. For technical details not described in detail in this embodiment, reference may be made to any one of the preceding embodiments.

Embodiments of the present application further provide a second node. The symbol reservation method applied to the second node may be performed by a symbol reservation apparatus which may be implemented by software and/or hardware and integrated in the second node. The notification method may be performed by the notification apparatus which may be implemented by software and/or hardware and integrated in the second node. The second node is a parent node of the IAB node.

Figure 14:
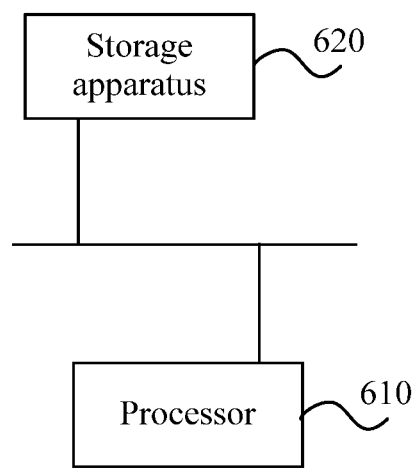
FIG. 14 is a structural diagram of hardware of a second node according to an embodiment.

FIG. 14 is a structural diagram of hardware of a second node according to an embodiment. As shown in FIG. 14, the second node provided in this embodiment includes a processor 610 and a storage apparatus 620. The second node may include one or more processors. One processor 610 is shown as an example in FIG. 14. The processor 610 and the storage apparatus 620 in the device may be connected via a bus or other manners. The connection via a bus is shown as an example in FIG. 14.

When executed by the one or more processors 610, the one or more programs cause the one or more processors to implement the symbol reservation method and the notification method applied to the second node according to any embodiment described above.

The storage apparatus 620 in the second node, as a computer-readable storage medium, may be configured to store one or more programs which may be software programs, computer-executable programs and modules, such as program instructions/modules (for example, modules in the symbol reservation apparatus, including an element determination module 21 and an indication module 22, as shown in FIG. 10) corresponding to the symbol reservation method applied to the second node in embodiments of the present application. The processor 610 executes software programs, instructions, and modules stored in the storage apparatus 620 to perform various function applications and data processing of the second node, that is, to implement the symbol reservation method or the notification method applied to the second node in the preceding method embodiments.

The storage apparatus 620 mainly includes a program storage region and a data storage region. The program storage region may store an operating system and an application program required by at least one function. The data storage region may store data (such as the first element set and indication information in the preceding embodiments) created based on use of the device. In addition, the storage apparatus 620 may include a high-speed random-access memory and may further include a nonvolatile memory, such as at least one disk memory, a flash memory, or another nonvolatile solid-state memory. In some examples, the storage apparatus 620 may further include memories remotely disposed relative to the processor 610, and these remote memories may be connected to the second node via a network. Examples of the above network include, but are not limited to, the Internet, an intranet, a local area network, a mobile communication network and a combination thereof.

Moreover, the one or more programs included in the preceding second node, when executed by the one or more processors 610, implement the following operations: determining a first element set; and sending indication information, where the indication information is used for notifying a first node that the second node reserves or does not reserve a guard symbol at a transition in a case where a second unit of the first node performs transmission or reception on elements in the first element set; or may also implement the following operations: determining a first element set; and sending notification information, where the notification information is used for notifying a first node of known information about the second node to the first element set, and the second node to reserve or not reserve a guard symbol at a transition in a case where a second unit of the first node performs transmission or reception on elements in the first element set.

The second node provided in this embodiment and the symbol reservation method or notification method applied to the second node provided in the preceding embodiments belong to the same concept. For technical details not described in detail in this embodiment, reference may be made to any one of the preceding embodiments.

Embodiments of the present application further provide a storage medium including computer-executable instructions. When executed by a computer processor, the computer-executable instructions cause the computer processor to perform a symbol reservation method, an inquiry method or a notification method.

From the preceding description of embodiments, it is apparent to those skilled in the art that the present application may be implemented by use of software and general-purpose hardware or may be implemented by hardware. Based on this understanding, the technical solutions of the present application may be embodied in the form of a software product. The computer software product may be stored in a computer-readable storage medium, such as a floppy disk, a read-only memory (ROM), a random-access memory (RAM), a flash memory, a hard disk, or an optical disk of a computer and includes multiple instructions for causing a computer device (which may be a personal computer, a server, or a network device) to perform the method in any embodiment of the present application.

The preceding are only example embodiments of the present application and not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, for example, but not limited to, a read-only memory (ROM), a random-access memory (RAM), and an optical memory device and system (a digital versatile disc (DVD) or a compact disc (CD)). Computer-readable media may include non-transitory storage media. The data processor may be of any type suitable to the local technical environment, such as, but is not limited to, a general-purpose computer, a special purpose computer, a microprocessor, a digital signal processor (DSP), an application specific integrated circuit (ASIC), a field programmable gate array (FPGA), and a processor based on a multi-core processor architecture.

What is claimed is:

1. A symbol reservation method, applied to a first node, comprising:
    determining a first element set; and
    sending request information, wherein the request information is used for requesting to reserve or not to reserve a guard symbol at a transition in a case where a second unit of the first node performs transmission or reception on elements in the first element set, and the first element set is used to indicate that the first node requests a second node to perform a guard symbol reservation mechanism in a case where the first node transmits at least one of a signal or a channel,
    wherein the first element set is an empty set, or the first element set comprises one of the following:
    a first set;
    a second set, which is a subset of a first set;
    a third set, which is one set of a set group;
    a set composed of elements in a first set other than elements in a second set which is a subset of the first set; or
    a set composed of elements in a set group other than elements in a third set which is one set of the set group,
    wherein the transition comprises:
    a transition between an operation of a first unit of the first node and an operation of the second unit of the first node; or
    a transition between an operation of the second unit on a first attribute resource and an operation of the second unit on a second attribute resource; or
    a transition between a first attribute resource corresponding to the second unit and a second attribute resource corresponding to the second unit, and
    wherein the first attribute resource comprises at least one of the following: a not available (NA) resource, a not indicated available (NIA) soft resource, a time unit where an NA resource is located, or a time unit where an NIA soft resource is located; and
    the second attribute resource comprises at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

2. The method of claim 1, wherein the first set is an empty set, or the first set comprises at least one of the following:
    a periodic channel state information reference signal (CSI-RS), a synchronization signal block and physical broadcast channel (SSB), a random access channel (RACH), a scheduling request (SR) or a physical downlink control channel (PDCCH) corresponding to a type 0 search space.

3. The method of claim 1, wherein the set group comprises at least one set, and each set of the at least one set corresponds to a serial number; and
    each set is an empty set or comprises at least one of the following elements:
    a periodic CSI-RS, a SSB, a RACH, a SR or a PDCCH corresponding to a type 0 search space.

4. The method of claim 2, wherein the PDCCH corresponding to the type 0 search space is a PDCCH corresponding to a type 0 search space configured in a master indication block (MIB).

5. The method of claim 1, wherein
    the first set is predefined or determined according to first signaling;
    the second set is predefined or determined according to first signaling;
    the third set is predefined or determined according to first signaling; and
    the set group is predefined or determined according to first signaling.

6. The method of claim 1, wherein the first set, the second set and the third set belong to a candidate first set, a candidate second set and a candidate third set, respectively;
    wherein the candidate first set, the candidate second set and the candidate third set are predefined or determined according to second signaling; and
    the first set, the second set and the third set are determined from the candidate first set, the candidate second set and the candidate third set, respectively.

7. The method of claim 1, wherein the request information is sent through a media access control control element (MAC CE) or high layer signaling.

8. The method of claim 1, wherein the first node is an integrated access and backhaul (IAB) node, and a second node is a parent node of the first node; and
    a first unit is a mobile terminal (MT) of the IAB node, and the second unit is a distributed unit (DU) of the IAB node.

9. A first node, comprising:
    at least one processor; and
    a storage apparatus configured to store at least one program;
    wherein the at least one program, when executed by the at least one processor, causes the at least one processor to perform the symbol reservation method of claim 1.

10. A non-transitory computer-readable storage medium, which is configured to store computer programs for implementing the symbol reservation method of claim 1 when the computer programs are executed by a processor.

11. A symbol reservation method, applied to a second node, comprising:
    determining a first element set; and
    sending indication information, wherein the indication information is used for notifying a first node that the second node reserves or does not reserve a guard symbol at a transition in a case where a second unit of the first node performs transmission or reception on elements in the first element set, and the first element set is used to indicate that the first node requests a second node to perform a guard symbol reservation mechanism in a case where the first node transmits at least one of a signal or a channel,
    wherein the first element set is an empty set, or the first element set comprises one of the following:

a first set;
a second set, which is a subset of a first set;
a third set, which is one set of a set group;
a set composed of elements in a first set other than elements in a second set which is a subset of the first set; or
a set composed of elements in a set group other than elements in a third set which is one set of the set group,
wherein the transition comprises:
a transition between an operation of a first unit of the first node and an operation of the second unit of the first node; or
a transition between an operation of the second unit on a first attribute resource and an operation of the second unit on a second attribute resource; or
a transition between a first attribute resource corresponding to the second unit and a second attribute resource corresponding to the second unit, and
wherein the first attribute resource comprises at least one of the following: a not available (NA) resource, a not indicated available (NIA) soft resource, a time unit where an NA resource is located, or a time unit where an NIA soft resource is located; and
the second attribute resource comprises at least one of the following: a resource occupied by the elements in the first element set, an NA resource or an NIA soft resource occupied by the elements in the first element set, a time unit where a resource occupied by the elements in the first element set is located, or a time unit where an NA resource or an NIA soft resource occupied by the elements in the first element set is located.

12. The method of claim 11, wherein the first set is an empty set, or the first set includes one of the following:
a periodic channel state information reference signal (CSI-RS), a synchronization signal block and physical broadcast channel (SSB), a random access channel (RACH), a scheduling request (SR) or a physical downlink control channel (PDCCH) corresponding to a type 0 search space.

13. The method of claim 11, wherein the set group comprises at least one set, and each set of the at least one set corresponds to a serial number; and
each set is an empty set or comprises at least one of the following:
a periodic CSI-RS, a SSB, a RACH, a SR or a PDCCH corresponding to a type 0 search space.

14. A second node, comprising:
at least one processor; and
a storage apparatus configured to store at least one program;
wherein the at least one program, when executed by the at least one processor, causes the at least one processor to perform the symbol reservation method of claim 11.

* * * * *